United States Patent
Smith et al.

(10) Patent No.: US 7,264,226 B2
(45) Date of Patent: Sep. 4, 2007

(54) REMOTELY-ADJUSTABLE SUPPORT APPARATUS AND METHODS

(75) Inventors: David C. Smith, Kirkland, WA (US); Ronald D. Curl, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 563 days.

(21) Appl. No.: 10/750,407

(22) Filed: Dec. 30, 2003

(65) Prior Publication Data

US 2005/0189454 A1  Sep. 1, 2005

(51) Int. Cl.
*A62B 3/00* (2006.01)

(52) U.S. Cl. .................. 254/93 R; 254/103
(58) Field of Classification Search ........... 254/93 R, 254/103, 89 H, 93 VA
See application file for complete search history.

(56) References Cited

U.S. PATENT DOCUMENTS

| | | | | |
|---|---|---|---|---|
| 3,765,650 A | * | 10/1973 | Eisenhauer | ............. 254/133 R |
| 3,918,683 A | * | 11/1975 | Millar | ............. 254/93 R |
| 4,270,733 A | * | 6/1981 | DePue | ............. 254/93 R |
| 4,762,304 A | * | 8/1988 | Hill | ............. 254/93 R |
| 5,083,407 A | * | 1/1992 | Fischer | ............. 52/511 |
| 5,400,994 A | | 3/1995 | Shawwaf et al. | |
| 5,513,825 A | | 5/1996 | Gutgsell | |
| 5,516,069 A | | 5/1996 | Hanna | |
| 5,979,854 A | | 11/1999 | Lundgren et al. | |
| 6,347,489 B1 | | 2/2002 | Marshall, Jr. et al. | |
| 6,349,512 B1 | | 2/2002 | Berkey et al. | |
| 6,612,533 B2 | | 9/2003 | Biles et al. | |

\* cited by examiner

*Primary Examiner*—Lee D. Wilson
(74) *Attorney, Agent, or Firm*—Lee & Hayes, PLLC (57) ABSTRACT

Remotely-adjustable support apparatus and methods are disclosed. In one embodiment, an apparatus includes a primary support and a secondary support moveably coupled to the primary support. The secondary support includes a cradle member adapted to engage the workpiece. The apparatus further includes a drive assembly operatively coupled to the secondary support and adapted to move the secondary support relative to the primary support. A control device is remotely positionable with respect to the drive assembly and operatively coupled to the drive assembly. The control device is adapted to transmit at least one control signal to the drive assembly to move the secondary support relative to the primary support.

32 Claims, 4 Drawing Sheets

REMOTELY-ADJUSTABLE SUPPORT APPARATUS AND METHODS

FIELD OF THE INVENTION

The present disclosure relates to support apparatus and methods, and more specifically, to remotely-adjustable T-stand supports.

BACKGROUND OF THE INVENTION

Many different types of products include elongated components, and it is often necessary to perform manufacturing operations on such elongated components prior to final assembly. For example, a commercial airplane typically has many elongated tubes, including tubes having various bends and turns. Such tubes may require processing, such as swaging fittings onto the ends, to allow the tubes to be assembled with other components. In many cases, the processing of such elongated components prior to final assembly may be difficult.

For example, in the above-noted example, a conventional tube swaging process involves a mechanic operating a swaging machine with one hand while inserting an end of an elongated tube with the other hand. The elongated tube may be relatively long and oddly shaped. Thus, the weight of the elongated tube as it projects outwardly from the swaging machine is supported by the mechanic's hand. Alternately, a fixed support may be positioned under a distal end of the elongated tube, or another mechanic may support the distal end, during the swaging process.

Although desirable results have been achieved using such prior art methods, there may be room for improvement. For example, because the elongated tubes typically are irregularly shaped, each elongated tube may have a different balance point. It may therefore be necessary for the mechanic to manually support the elongated tube during the swaging process whenever the fixed support does not accommodate the particular geometry of the elongated tube. Involving two mechanics in the process of swaging the elongated tubes undesirably increases the labor costs associated with this manufacturing process. Thus, apparatus and methods of supporting elongated members that mitigate or eliminate these disadvantages would be useful.

SUMMARY OF THE INVENTION

The present invention is directed to remotely-adjustable support apparatus and methods. Apparatus and methods in accordance with the present invention may advantageously improve efficiency and accuracy during the performance of manufacturing operations, thereby increasing throughput and reducing costs associated with the manufacturing operations.

In one embodiment, an apparatus for moveably supporting a workpiece above a support surface includes a primary support adapted to engage the support surface, and a secondary support moveably coupled to the primary support. The secondary support includes a cradle member adapted to engage the workpiece. The apparatus further includes a drive assembly operatively coupled to the secondary support and adapted to move the secondary support relative to the primary support in at least one of a first direction away from the support surface and in a second direction toward the support surface. A control device is remotely positionable with respect to the drive assembly and operatively coupled to the drive assembly. The control device is adapted to transmit at least one of a first control signal to the drive assembly to move the secondary support in the first direction and a second control signal to the drive assembly to move the secondary support in the second direction.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to remotely-adjustable support apparatus and methods. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without several of the details described in the following description.

Figure 1:
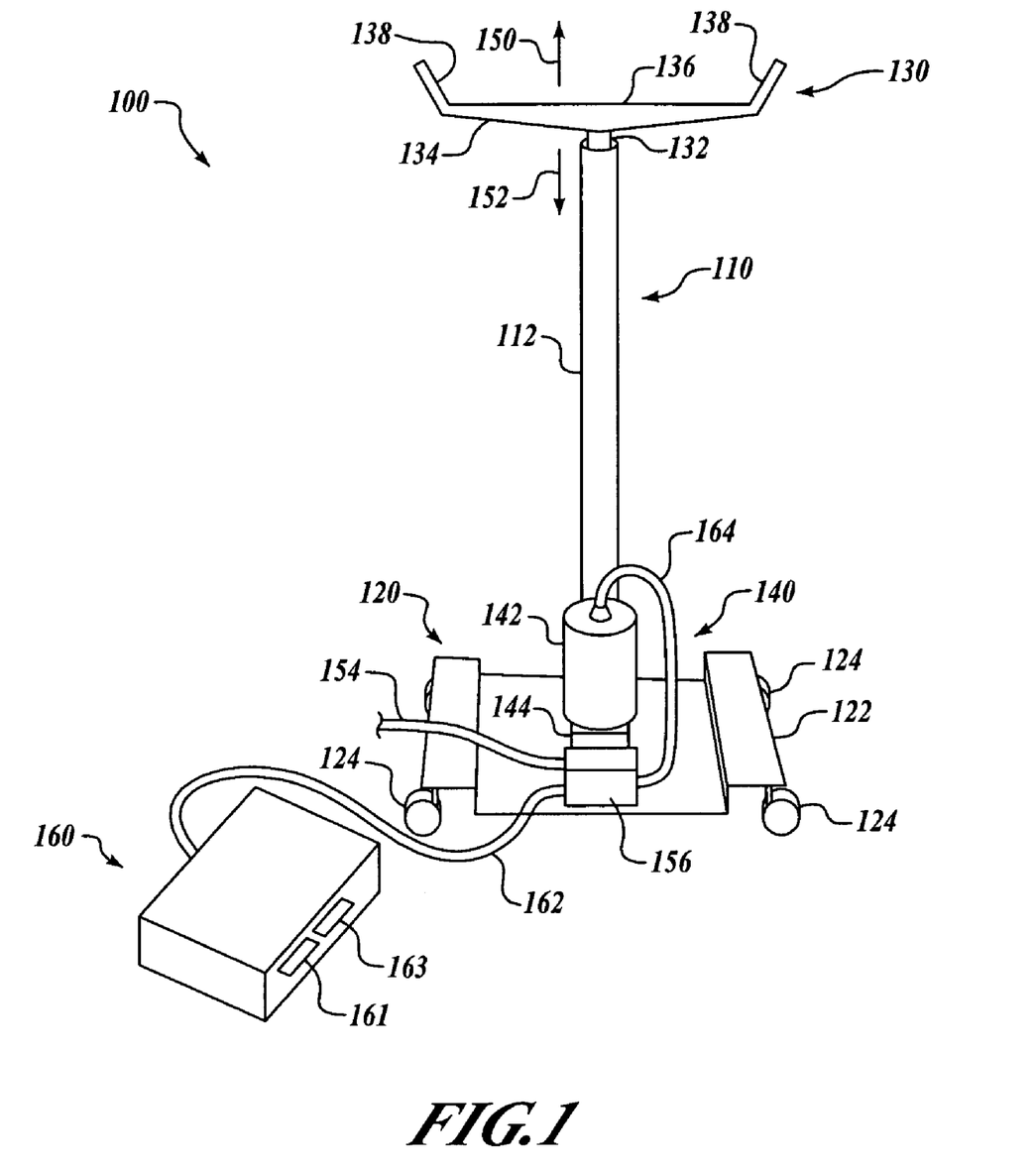
FIG. 1 is a front isometric view of a remotely-adjustable support assembly in accordance with an embodiment of the present invention.
Figure 2:
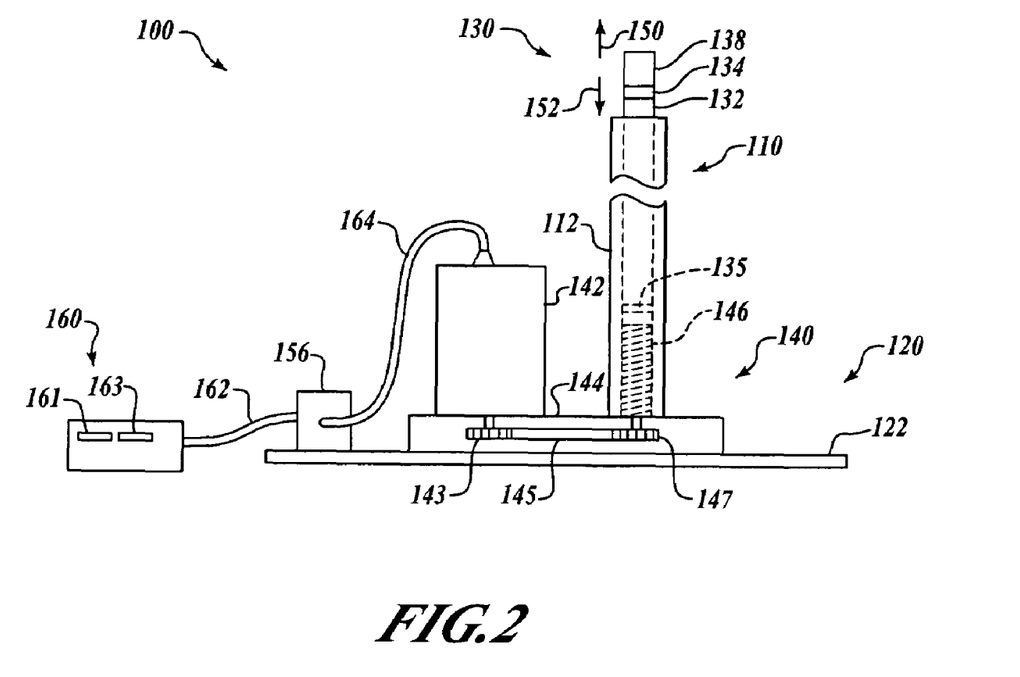
FIG. 2 is a partial cross-sectional side view of the support assembly of FIG. 1.

FIG. 1 is a front isometric view of a remotely-adjustable support assembly 100 in accordance with an embodiment of the present invention. FIG. 2 is a partial cross-sectional side view of the support assembly 100 of FIG. 1. In this embodiment, the support assembly 100 includes a primary support 110 coupled to a base assembly 120, and a secondary support 130 moveably coupled to the primary support 110. The base assembly 120 includes a plate member 122 equipped with a plurality of rollers 124. In one particular embodiment, the primary support 110 includes a cylindrical column 112, and the secondary support 130 includes a cylindrical portion 132 that is slideably disposed within the cylindrical column 112. As best shown in FIG. 1, the secondary support 130 includes an enlarged cradle portion 134 having a laterally-extending receiving surface 136 and a pair of upwardly projecting side surfaces 138. The cradle portion 134 is adapted to receive and support a workpiece (not shown), as described more fully below.

As further shown in FIGS. 1 and 2, a drive assembly 140 is operatively coupled to the secondary support 130 and adapted to move the secondary support 130 in first and second directions 150, 152 relative to the primary support 110. In this embodiment, the drive assembly 140 includes an electric motor 142 coupled to a first gear 143 disposed within a gearbox 144, and a threaded shaft 146 coupled to a second gear 147. A coupling member 145 (e.g. a drive belt, chain, etc.) operatively couples the first and second gears 143, 147. As shown in FIG. 2, the threaded shaft 146 is engaged through a threaded portion 135 (e.g. a nut) of the secondary support 130. The drive assembly 140 having the threaded shaft 146 of the type shown in FIGS. 1 and 2 may be of generally-known construction, including, for example, those linear actuators commercially-available from the Thomson Saginaw Ball Screw Company of Saginaw, Mich.

A control device 160 is operatively coupled to the drive assembly 140 and includes a first control pedal 161 and a second control pedal 163. The control device 160 is adapted to transmit a first control signal to the drive assembly 140 to drive the secondary support 130 in the first direction 150 (e.g. by depressing the first control pedal 161), and a second control signal to the drive assembly 140 to drive the secondary support 130 in the second direction 152 (e.g. by depressing the second control pedal 163). The support assembly 100 further includes a power cable 154 coupled between a power source (not shown) and a junction box 156, and a control cable 162 coupled between the control device 160 and the junction box 156. A control link 164 is coupled between the junction box 156 and the electric motor 142 and serves to provide power and control signals thereto.

More specifically, in operation, the control device 160 transmits the first control signal to the drive assembly 140, causing the motor 142 to rotate the first gear 143 in a first direction. In turn, the rotation of the first gear 143 causes rotation of the second gear 147 and the threaded shaft 146, which engages with the threaded portion 135 of the secondary support 130. Thus, the secondary support 130 is driven in the first (or upward) direction 150 by the rotation of the threaded shaft 146. Similarly, in response to the second control signal, the motor 142 rotates in a second direction, causing a counter-rotation of the threaded shaft 146 which results in movement of the secondary support 130 in the second or downward direction 152. Because the control device 160 is operatively coupled to the drive assembly 140 by an elongated control cable 162, an operator may adjust the position of the secondary support 130 from a remote position. In alternate embodiments, the control cable 162 may be eliminated, and the control device 160 and drive assembly 140 may be equipped with appropriate sensors for wireless transmission and reception of electromagnetic (or acoustic) signals, thereby enabling remote, wireless control of the support assembly 100.

Figure 3:
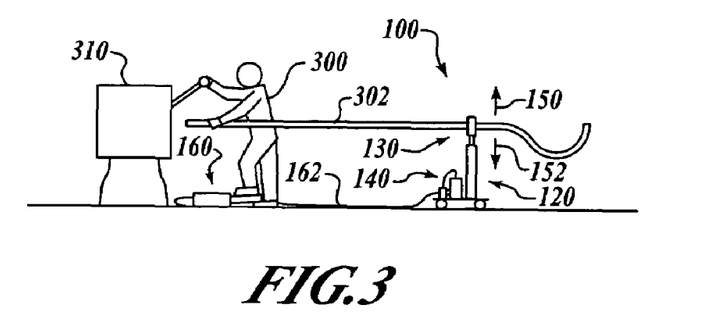
FIG. 3 is a schematic view of the remotely-adjustable support assembly of FIG. 1 in operation in accordance with an embodiment of the present invention.

It will be appreciated that the remotely-adjustable support assembly 100 may be utilized in a wide variety of manufacturing applications. For example, FIG. 3 is a schematic view of the remotely-adjustable support assembly 100 being used by an operator 300 to perform swaging on an elongated, oddly-shaped workpiece 302 in accordance with an embodiment of the present invention. In operation, the operator 300 manually supports a first end portion of the workpiece 302 (e.g. a tube or pipe), while a second end portion of the workpiece 302 is positioned within the cradle portion 134 of the secondary support 130. The operator 300 directs the first end portion of the workpiece 302 into engagement with a manufacturing device 310 (e.g. a swaging machine). In order to properly position the workpiece 302 for the manufacturing operation, the operator 300 raises or lowers the second end portion of the workpiece 302 by operating the first and second pedals 161, 163 of the control device 160, thereby moving the second end portion of the workpiece 302 in the first and second directions 150, 152. With the first and second end portions of the workpiece 302 properly positioned, the operator 300 may then engage the first end portion into the manufacturing device 310 to perform the desired manufacturing operation.

Embodiments of support assemblies in accordance with the present invention may provide significant advantages over the prior art. For example, because the position of the second end portion of the workpiece may be easily and conveniently adjusted using the support assembly, the manual effort and strain on the operator may be greatly reduced. This may advantageously improve the operator's job satisfaction, as well as improve the operator's efficiency and accuracy during the performance of the manufacturing operation. Also, since the support assembly may be remotely-adjusted by the operator from the first end portion of the workpiece, there is no need for the operator to walk back and forth between the first and second end portions of the workpiece to make the necessary position adjustments during repeated manufacturing operations. This aspect further increases the operator's efficiency and the overall throughput of the manufacturing operation, and decreases costs associated with the manufacturing operation.

It should be appreciated that a variety of modifications may be made to the support assembly described above and shown in FIGS. 1-3 to arrive at alternate embodiments of the invention, and that the invention is not limited to the particular embodiment of a support assembly described above. In the following discussion, several alternate embodiments of the invention will be described, however, this discussion is not intended to be an exhaustive list of all possible alternate embodiments, but rather, is provided merely to demonstrate a few of the multitude of possible embodiments that may be conceived in accordance with the teachings herein. For the sake of brevity, only significant differences or features of each such additional embodiment will be described in detail.

Figure 4:
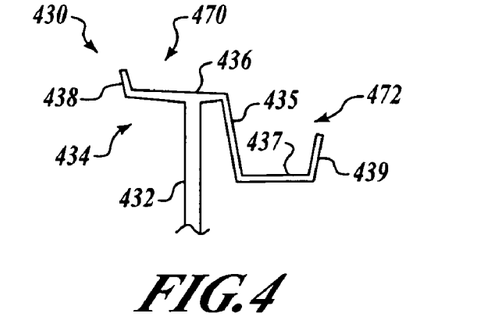
FIG. 4 is a front elevational view of a support head in accordance with an alternate embodiment of the invention.

FIG. 4 is a front elevational view of a secondary support 430 in accordance with an alternate embodiment of the invention. In this embodiment, the secondary support 430 includes a cylindrical portion 432 that is slideably disposed within the primary support 110 (FIG. 1), and an enlarged cradle portion 434. The cradle portion 434 has a first laterally-extending receiving member 436 and a first upwardly projecting side member 438 attached thereto. A downwardly projecting side member 435 is attached to the first laterally-extending receiving member 436 and extends to a second (or lower) laterally-extending receiving member 437. Finally, a second upwardly projecting side member 439 is coupled to the second receiving member 437. The first laterally-projecting member 436 and the first upwardly-projecting side member 438 cooperate to form a first receiving area 470 that is adapted to receive and support a workpiece (not shown) during manufacturing operations, while the second laterally-projecting member 437, the downwardly-projecting side member 435, and the second upwardly projecting side member 439 cooperate to form a second receiving area 472 that is also adapted to receive and support a workpiece during manufacturing operations.

Embodiments of remotely-adjustable support assemblies having the secondary support 430 as shown in FIG. 4 may provide additional advantages over the prior art, particularly for the performance of repeated manufacturing operations involving various oddly-shaped workpieces. Because the cradle portion 434 of the secondary support 430 forms both the first and second receiving areas 470, 472, the secondary support 430 may advantageously enable the successful support of various workpieces having different shapes, centers of gravity, etc., thereby improving the operator's efficiency, accuracy, and job satisfaction as described above.

Figure 5:
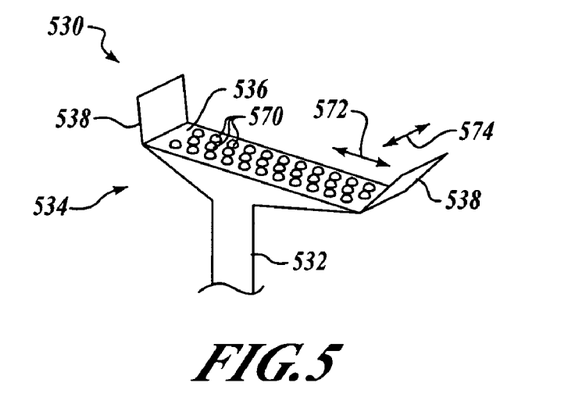
FIG. 5 is an enlarged, isometric view of a cradle portion of a secondary support in accordance with another alternate embodiment of the invention.
Figure 6:
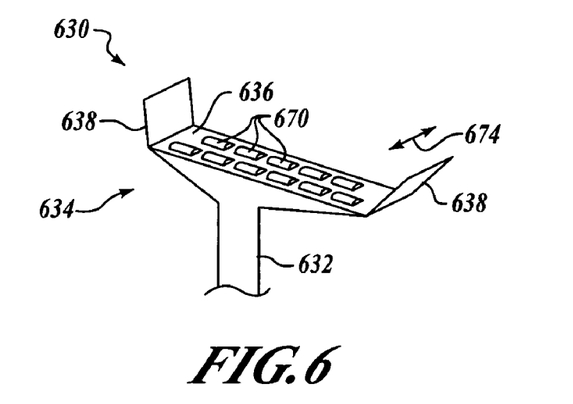
FIG. 6 is an enlarged, isometric view of a cradle portion of a secondary support in accordance with yet another alternate embodiment of the invention.

FIG. 5 is an enlarged, isometric view of a cradle portion 534 of a secondary support 530 in accordance with another alternate embodiment of the invention. It will be appreciated that the secondary support 530 is similar to the secondary support 130 described above and shown in FIGS. 1 and 2. As shown in FIG. 5, however, in this embodiment, the receiving surface 536 of the cradle portion 534 includes a plurality of partially-embedded ball bearings 570. Similarly, FIG. 6 is an enlarged, isometric view of a cradle portion 634 of a secondary support 630 having a plurality of roller bearings 670 partially-disposed within a receiving surface 636. In operation, the ball bearings 570 (or the roller bearings 670) are adapted to engage the workpiece and to allow movement of the workpiece across the receiving surface with reduced friction between the workpiece and the secondary support. It will be appreciated that the ball bearings 570 (FIG. 5) may effectively reduce or eliminate frictional force in both the lateral and transverse directions 572, 574, respectively, while the roller bearings 670 (FIG. 6) tend to effectively reduce frictional force in only the transverse direction 674.

Clearly, a variety of alternate embodiments of cradle portions may be conceived in accordance with the teachings disclosed herein. For example, in the embodiments shown in FIGS. 5 and 6, the side portions 538, 638 may be eliminated. Alternately, the sizes and number of the bearings 570, 670 of the embodiments shown in FIGS. 5 and 6 may be varied. In one particular embodiment, for example, the plurality of roller bearings 670 may be reduced to a single, relatively-larger roller bearing that may extend over any desired portion of the receiving surface 636, including over substantially the entire length of the receiving surface 636. It may also be appreciated that the receiving surface of the cradle portion need not be substantially flat, as shown in the accompanying figures, but rather, may be any desired non-planar shape, including contoured or arcuately shaped, V-shaped, or any other desired non-planar shape. In one particular embodiment, for example, a receiving surface may be a substantially V-shaped surface with a roller bearing on each side of the V-shaped surface, which may form a cradle portion well-suited to handling round stock, tubes, or other types of workpieces having a substantially round cross-sectional shape.

Figure 7:
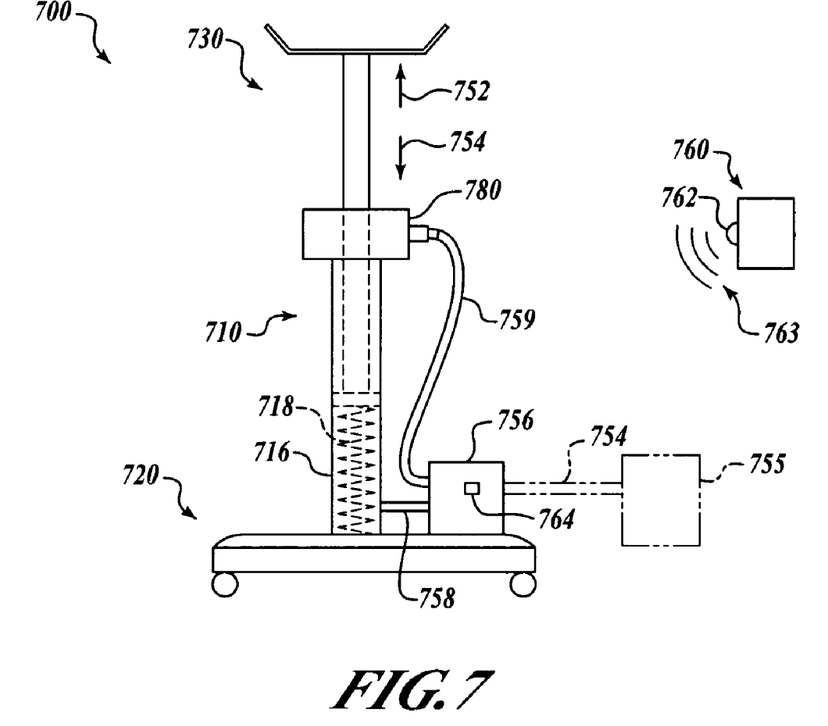
FIG. 7 is a front isometric view of a remotely-adjustable support assembly in accordance with a further embodiment of the invention.

FIG. 7 is a front isometric view of a remotely-adjustable support assembly 700 in accordance with a further embodiment of the invention. In this embodiment, the support assembly 700 includes a primary support 710 coupled to a base assembly 720, and a secondary support 730 moveably coupled to the primary support 710. The primary support 710 includes a pressurizeable portion 716 (e.g. a hydraulic or pneumatic piston) disposed between the secondary support 730 and the base assembly 720. In one particular embodiment, a spring member 718 may be disposed within the pressurizeable portion 716. A drive assembly 740 includes a valve assembly 756 coupled by a first supply line 758 to the pressurizeable portion 716, and by a second supply line 759 to a brake assembly 780. A primary supply line 754 couples the valve assembly 756 to a source of pressurized fluid (e.g. an air pump). The support assembly 700 further includes a wireless controller 760 having a transmitter 762 that transmits one or more control signals 763 (e.g. electromagnetic signals, acoustic signals, etc.) to a corresponding receiver on the valve assembly 756.

Figure 8:
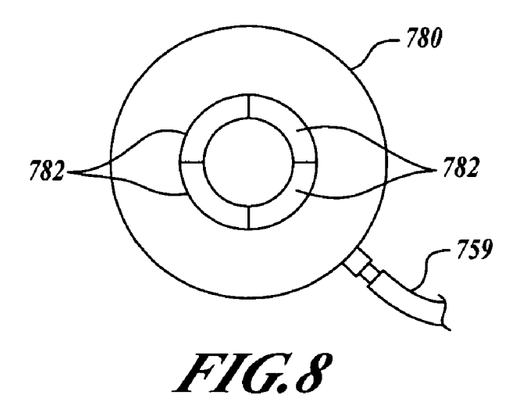
FIG. 8 is a top elevational view of an air chuck of the support assembly of FIG. 7.

In one particular embodiment, the brake assembly 780 comprises a pneumatically-driven air chuck (or collet). For example, FIG. 8 is a top elevational view of an air chuck 780 of the support assembly 700 of FIG. 7. In this embodiment, the air chuck 780 includes a plurality of clamping members 782 circumferentially disposed about the secondary support 730. The clamping members 782 are radially moveable such that the secondary support 730 may be controllably clamped and unclamped as desired using the air chuck 780. The air chuck 780 may be of generally-known construction, including, for example, those air chucks (or collets) commercially-available from Lexair, Inc. of Lexington, Ky., or from McMaster-Carr of Atlanta, Ga.

In operation, an operator may transmit appropriate control signals from the control device 760 to the valve assembly 756. The valve assembly 756 may include one or more valves that control the flow of pressurized fluid to the pressurizeable portion 716 and to the brake assembly 780. In response to a first control signal, the valve assembly 756 may provide pressurized fluid to the brake assembly 780, thereby causing the brake assembly 780 to unclamp (or release) from the secondary support 730. Also in response to the first control signal, the valve assembly 756 may provide pressurized fluid to the pressurizeable portion 716, causing the secondary support 730 to move in the upward direction 752. When the desired position of the secondary support 730 is achieved, the operator may desist from transmitting the first control signal, causing the valve assembly 756 to remove the flow of pressurized fluid to the brake assembly 780 and to the pressurizeable portion 716. With the pressurized fluid removed from the brake assembly 780, the brake assembly may return to a locked position, thereby securing the secondary support 730 in the desired position.

Similarly, if the operator desires to lower the secondary support 730, a second control signal may be transmitted from the control device 760 to the valve assembly 756. In response to the second control signal, the valve assembly 756 may again provide pressurized fluid to the brake assembly 780 causing the brake assembly 780 to release the secondary support, and may also vent or otherwise release the pressure from within the pressurizeable portion 716, thereby permitting the secondary support 730 to move in a downward direction 754 to a desired lower position. Again, once the secondary support 730 moves to the desired lower position, the operator may desist from transmitting the second control signal, causing the brake assembly 780 to return to the locked position, thereby securing the secondary support 730 in the desired lower position.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for moveably supporting a workpiece above a support surface, comprising:
   a primary support configured to engage the support surface;
   a secondary support moveably coupled to the primary support, the secondary support including a cradle member configured to engage the workpiece;
   a drive assembly operatively coupled to the secondary support and configured to move the secondary support relative to the primary support in at least one of a first direction away from the support surface and in a second direction toward the support surface; and
   a control device remotely positionable with respect to the drive assembly and operatively coupled to the drive assembly, the control device being configured to transmit at least one of a first control signal to the drive assembly to move the secondary support in the first direction and a second control signal to the drive assembly to move the secondary support in the second direction, wherein the control device includes a transmitter and the drive assembly includes a receiver, the transmitter being configured to the transmit at least one of an electromagnetic control signal and an acoustic control signal to the drive assembly and the receiver being configured to the receive the at least one control signal.

2. The apparatus according to claim 1 wherein the primary support comprises a cylindrical support having a base coupled to a first end thereof, the base being adapted to engage the support surface.

3. The appaxatus according to claim 1 wherein the cradle portion includes a laterally-extending receiving member and a pair of side members coupled to the receiving member, the side members projecting away from the receiving member, the receiving member and the side members defining a receiving area adapted to receive and support at least a portion of the workpiece.

4. The apparatus according to claim 1 wherein the cradle portion includes a first laterally-extending receiving member, a first side member coupled to the first receiving member and projecting upwardly therefrom, a second side member coupled to the first receiving member and projecting downwardly therefrom, a second laterally-extending receiving member coupled to the second side member, and a third side member coupled to the second receiving member and projecting upwardly therefrom, the first receiving member and the first side member defining a fFst receiving area and the second receiving member, and the second and third side members defining a second receiving area.

5. The apparatus according to claim 1 wherein the cradle portion includes a receiving surface defining at least one receiving area, the receiving surface being adapted to engage and support at least a portion of the workpiece.

6. The apparatus according to claim 5 wherein the receiving surface includes a plurality of ball bearings at least partially disposed therein.

7. The apparatus according to claim 5 wherein the receiving surface includes a plurality of roller bearings at least partially disposed therein.

8. The apparatus according to claim 1 wherein the drive assembly comprises an electric motor.

9. The apparatus according to claim 1 wherein the secondary support includes a threaded portion and the drive assembly includes a threaded shaft engaged with the threaded portion, the electric motor being operatively coupled to the threaded shaft.

10. The apparatus according to claim 1 wherein the drive assembly includes a pressurizeable portion.

11. The apparatus according to claim 10 wherein the drive assembly includes a valve assembly operatively coupled to the pressurizeable portion and adapted to provide a flow of a pressurized fluid to the pressurizeable portion in response to a first control signal.

12. The apparatus according to claim 10 wherein the drive assembly further includes:
a break assembly operatively coupled to the primary support and to the secondary support; and
a valve assembly operatively coupled to the pressurizeable portion and to the brake assembly, the valve assembly being adapted to provide a flow of a pressurized fluid to the pressurizeable portion in response to a first control signal.

13. The apparatus according to claim 12 wherein the brake assembly includes a plurality of clamping members, and wherein the second flow of the pressurized fluid causes the clamping members to disengage from the secondary support.

14. The apparatus according to claim 12 wherein the valve assembly is further adapted to provide a second flow of the pressurized fluid to the brake assembly in response to the first control signal.

15. The apparatus according to claim 14 wherein the valve assembly is further adapted to desist the first and second flows of the pressurized fluid to the pressurizeable portion and to the brake assembly, respectively, in response to a second control signal.

16. A method of performing a manufacturing operation on a workpiece, comprising:
manually supporting a first end portion of the workpiece above a support surface;
providing a support apparatus engaged with a second end portion of the workpiece, the second end portion being spaced apart from the first end portion, the support apparatus including a primary support engaged with the support surface, a secondary support moveably coupled to the primary support and engaged with the second end portion of the workpiece, and a drive assembly operatively coupled to the secondary support; and
controllably adjusting a position of the second end portion of the workpiece by actuating the drive assembly to adjust the secondary support relative to the primary support, wherein controllably actuating an electric motor includes transmitting at least one of an electromagnetic signal and an acoustic signal to the drive assembly.

17. The method according to claim 16 wherein providing a support apparatus having a secondary support comprises providing a support apparatus having a secondary support that includes a laterally-extending receiving member and a pair of side members coupled to the receiving member, the side members projecting away from the receiving member, the receiving member and the side members defining a receiving area adapted to receive and support at least a portion of the workpiece.

18. The method according to claim 16 wherein providing a support apparatus having a secondary support comprises providing a support apparatus having a secondary support that includes a first laterally-extending receiving member, a first side member coupled to the first receiving member and projecting upwardly therefrom, a second side member coupled to the first receiving member and projecting downwardly therefrom, a second laterally-extending receiving member coupled to the second side member, and a third side member coupled to the second receiving member and projecting upwardly therefrom, the first receiving member and the first side member defining a first receiving area and the second receiving member, and the second and third side members defining a second receiving area.

19. The method according to claim 16 wherein providing a support apparatus having a secondary support comprises providing a support apparatus having a secondary support that includes a cradle portion, the cradle portion having a receiving surface defining at least one receiving area and having a plurality of ball bearings at least partially disposed therein.

20. The method according to claim 16 wherein providing a support apparatus having a secondary support comprises providing a support apparatus having a secondary support that includes a cradle portion, the cradle portion having a receiving surface defining at least one receiving area and having a plurality of roller bearings at least partially disposed therein.

21. The method according to claim 16 wherein controllably adjusting a position of the second end portion of the workpiece includes controllably actuation an electric motor.

22. The method according to claim 16 wherein controllably actuating an electric motor includes transmitting a first control signal along a first control cable.

23. The method according to claim 16 wherein controllably adjusting a position of the second end portion of the workpiece includes controllably rotating a threaded shaft engaged with a threaded portion of the secondary support.

24. The method according to claim 16 wherein controllably adjusting a position of the second end portion of the workpiece includes providing a flow of pressurized fluid to a pressurizeable portion of the drive assembly.

25. The method according to claim 16 wherein controllably adjusting a position of the second end portion of the workpiece includes providing a first flow of pressurized fluid to a pressurizeable portion of the drive assembly, and providing a second flow of pressurized fluid to a brake assembly.

26. An apparatus for moveably supporting a workpiece above a support surface, comprising:
   a primary support configured to engage the support surface;
   a secondary support moveably coupled to the primary support, the secondary support including a cradle member configured to engage the workpiece;
   a drive assembly operatively coupled to the secondary support and configured to move the secondary support relative to the primary support in at least one of a first direction away from the support surface and in a second direction toward the support surface; and
   a control device remotely positionable with respect to the drive assembly and operatively coupled to the drive assembly, the control device being configured to transmit at least one of a first control signal to the drive assembly to move the secondary support in the first direction and a second control signal to the drive assembly to move the secondary support in the second direction, wherein the cradle portion includes a receiving surface defining at least one receiving area, the receiving surface being configured to engage and support at least a portion of the workpiece, and wherein the receiving surface includes at least one of a plurality of ball bearings and a plurality of roller bearings at least partially disposed therein.

27. An apparatus for moveably supporting a workpiece above a support surface, comprising:
   a primary support configured to engage the support surface;
   a secondary support moveably coupled to the primary support, the secondary support including a cradle member configured to engage the workpiece;
   a drive assembly operatively coupled to the secondary support and configured to move the secondary support relative to the primary support in at least one of a first direction away from the support surface and in a second direction toward the support surface, wherein the drive assembly includes:
   a pressurizeable portion;
   a brake assembly operatively coupled to the primary support and to the secondary support; and
   a valve assembly operatively coupled to the pressurizeable portion and to the brake assembly, the valve assembly being configured to provide a flow of a pressurized fluid to the pressurizeable portion in response to a first control signal, wherein the valve assembly is further configured to provide a second flow of the pressurized fluid to the brake assembly in response to the first control signal; and
   a control device remotely positionable with respect to the drive assembly and operatively coupled to the drive assembly, the control device being configured to transmit at least one of a first control signal to the drive assembly to move the secondary support in the first direction and a second control signal to the drive assembly to move the secondary support in the second direction.

28. An apparatus for moveably supporting a workpiece above a support surface, comprising:
   a primary support configured to engage the support surface;
   a secondary support moveably coupled to the primary support, the secondary support including a cradle member configured to engage the workpiece;
   a drive assembly operatively coupled to the secondary support and configured to move the secondary support relative to the primary support in at least one of a first direction away from the support surface and in a second direction toward the support surface, wherein the drive assembly includes:
   a pressurizeable portion;
   a brake assembly operatively coupled to the primary support and to the secondary support; and
   a valve assembly operatively coupled to the pressurizeable portion and to the brake assembly, the valve assembly being configured to provide a flow of a pressurized fluid to the pressurizeable portion in response to a first control signal, wherein the brake assembly includes a plurality of clamping members, and wherein the second flow of the pressurized fluid causes the clamping members to disengage from the secondary support; and
   a control device remotely positionable with respect to the drive assembly and operatively coupled to the drive assembly, the control device being configured to transmit at least one of a first control signal to the drive assembly to move the secondary support in the first direction and a second control signal to the drive assembly to move the secondary support in the second direction.

29. A method of performing a manufacturing operation on a workpiece, comprising:
   manually supporting a first end portion of the workpiece above a support surface;
   providing a support apparatus engaged with a second end portion of the workpiece, the second end portion being spaced apart from the first end portion, the support apparatus including a primary support engaged with the support surface, a secondary support moveably coupled to the primary support and engaged with the second end portion of the workpiece, and a drive assembly operatively coupled to the secondary support, wherein the support apparatus has a secondary support that includes a cradle portion, the cradle portion having a receiving surface defining at least one receiving area and having at least one of a plurality of ball bearings and a plurality of roller bearings at least partially disposed therein; and controllably adjusting a position of the second end portion of the workpiece by actuating the drive assembly to adjust the secondary support relative to the primary support.

30. A method of performing a manufacturing operation on a workpiece, comprising:

manually supporting a first end portion of the workpiece above a support surface;

providing a support apparatus engaged with a second end portion of the workpiece, the second end portion being spaced apart from the first end portion, the support apparatus including a primary support engaged with the support surface, a secondary support moveably coupled to the primary support and engaged with the second end portion of the workpiece, and a drive assembly operatively coupled to the secondary support; and controllably adjusting a position of the second end portion of the workpiece by actuating the drive assembly to adjust the secondary support relative to the primary support, including providing a first flow of pressurized fluid to a pressurizeable portion of the drive assembly, and providing a second flow of pressurized fluid to a brake assembly.

31. An apparatus for moveably supporting a workpiece above a support surface, comprising:

a primary support configured to engage the support surface;

a secondary support moveably coupled to the primary support, the secondary support including a cradle member configured to engage the workpiece, wherein the cradle portion includes:

a first laterally-extending receiving member, a first side member coupled to the first receiving member and projecting upwardly therefrom, a second side member coupled to the first receiving member and projecting downwardly therefrom, a second laterally-extending receiving member coupled to the second side member, the second receiving member being approximately planar, and a third side member coupled to the second receiving member and projecting upwardly therefrom, the first receiving member and the first side member defining a first receiving area and the second receiving member, and the second and third side members defining a second receiving area, wherein the first receiving area is at least partially defined by a first receiving surface and the second receiving area is at least partially defined by a second receiving surface, the first and second receiving surfaces being adapted to engage and support at least a portion of the workpiece, at least one of the first and second receiving surfaces including at least one of a plurality of ball bearings and a plurality of roller bearings at least partially disposed therein;

a drive assembly operatively coupled to the secondary support and configured to move the secondary support relative to the primary support in at least one of a first direction away from the support surface and in a second direction toward the support surface; and a control device remotely positionable with respect to the drive assembly and operatively coupled to the drive assembly, the control device being configured to transmit at least one of a first control signal to the drive assembly to move the secondary support in the first direction and a second control signal to the drive assembly to move the secondary support in the second direction.

32. The apparatus according to claim 31 wherein the drive assembly includes:

a pressurizeable portion;

a brake assembly operatively coupled to the primary support and to the secondary support; and a valve assembly operatively coupled to the pressurizeable portion and to the brake assembly, the valve assembly being configured to provide a flow of a pressurized fluid to the pressurizeable portion in response to a first control signal, wherein the valve assembly is further configured to provide a second flow of the pressurized fluid to the brake assembly in response to the first control signal.

* * * * *